United States Patent
Lee et al.

(10) Patent No.: US 6,670,402 B1
(45) Date of Patent: Dec. 30, 2003

(54) RAPID AEROGEL PRODUCTION PROCESS

(75) Inventors: Kang P. Lee, Sudbury, MA (US); Redouane Begag, Marlboro, MA (US); Zlatko Altiparmakov, Shrewsbury, MA (US)

(73) Assignee: Aspen Aerogels, Inc., Marlborough, MA (US)

( * ) Notice: Subject to any disclaimer, the term of this patent is extended or adjusted under 35 U.S.C. 154(b) by 0 days.

(21) Appl. No.: 09/693,390

(22) Filed: Oct. 20, 2000

Related U.S. Application Data

(60) Provisional application No. 60/160,464, filed on Oct. 21, 1999.

(51) Int. Cl.[7] ........................ B01J 13/00; C01B 33/158; F26B 5/02
(52) U.S. Cl. ..................... 516/111; 34/405; 34/413; 423/338; 501/12; 516/99; 516/102; 516/104
(58) Field of Search ........................ 516/99, 102, 104, 516/111; 423/338; 501/12; 34/405, 413

(56) References Cited

U.S. PATENT DOCUMENTS

| | | | | |
|---|---|---|---|---|
| 2,993,005 A | * | 7/1961 | Kosmin et al. | 423/338 |
| 4,619,908 A | * | 10/1986 | Cheng et al. | 423/338 X |
| 4,667,417 A | * | 5/1987 | Graser et al. | 516/111 X |
| 4,894,357 A | * | 1/1990 | Hupe et al. | 516/111 X |
| 5,122,291 A | * | 6/1992 | Wolff et al. | 516/111 X |
| 5,207,814 A | * | 5/1993 | Cogliati et al. | 501/12 X |
| 5,409,683 A | * | 4/1995 | Tillotson et al. | 516/111 X |
| 5,473,826 A | * | 12/1995 | Kirkbir et al. | 34/405 |
| 5,496,527 A | * | 3/1996 | Yokogawa et al. | 423/338 |
| 5,795,557 A | * | 8/1998 | Pajonk et al. | 423/338 |
| 5,935,895 A | * | 8/1999 | Baiker et al. | 516/111 X |
| 5,958,363 A | * | 9/1999 | Coronado | 423/338 X |
| 6,071,487 A | * | 6/2000 | Campion et al. | 423/338 |

\* cited by examiner

*Primary Examiner*—Richard D. Lovering
(74) *Attorney, Agent, or Firm*—Bruce F. Jacobs

(57) ABSTRACT

Methods of more rapidly producing aerogel products by means of a rapid solvent exchange of solvent inside wet gels with supercritical $CO_2$ by injecting supercritical, rather than liquid, $CO_2$ into an extractor that has been pre-heated and pre-pressurized to substantially supercritical conditions or above. Preferably, pressure waves are applied to the supercritical $CO_2$ to enhance the solvent exchange. The rapid solvent exchange process is followed by depressurization, optionally with a gas exchange. Preferably, pressure waves are used to speed up the depressurization. The process greatly reduces the time for forming aerogel products.

16 Claims, No Drawings

RAPID AEROGEL PRODUCTION PROCESS

This application claims the benefit of U.S. Provisional Application(s) No(s).: 60/160,464 filing date Oct. 21, 1999.

BACKGROUND OF THE INVENTION

The present invention is directed to an improved method for preparing an aerogel product, e.g. bead, composite or monolith, in which the time required to perform solvent exchange and drying, is substantially reduced.

Aerogel products, after wet gel formation, are conventionally prepared by a process of liquid $CO_2$ extraction of whatever solvent(s) is utilized to form the wet gels followed by a supercritical $CO_2$ extraction. More particularly, a sol-gel technique is used to prepare wet gels in a solvent such as ethanol or ethyl acetate. The wet gels are placed into a suitable mold and then aged, commonly overnight. As practiced by the assignee of this application in making sample quantities of aerogel products, and as disclosed in, for example, U.S. Pat. No. 5,395,805 to Coronado et al., the solvent must next be removed to form a desired aerogel monolith. To do this, the wet gels are quickly placed into an extractor that is filled with liquid carbon dioxide and a relatively long solvent exchange process begins during which the temperature and pressure are maintained below critical conditions. Once the solvent exchange is complete, the extractor is sealed and the sealed extractor is heated to above the critical point of the $CO_2$. After a short thermal stabilization period, the extractor is slowly depressurized while it is heated to maintain the temperature inside the aerogels sufficiently high to avoid condensing the $CO_2$ as the pressure is decreased to 1 atmosphere.

The time required to perform these steps is highly dependent upon the physical size of the extractor, and the physical size of the extractor determines the maximum physical size of an aerogel monolith piece which can be produced. For example, to prepare five high quality crack-free aerogel monolith panels each of which is 5"×9"×1", (12.7 cm×22.9 cm×2.5 cm) a 40 liter extractor is used and the extractor time required to produce the monolith panels is about 40 hours. This total time begins with about 5 to 20 minutes to quickly place the wet gels into the extractor. After the extractor is filled with liquid $CO_2$, it takes about 30 hours to replace the solvent in the gels using liquid $CO_2$. The solvent exchange step takes so long because it must rely on the diffusivity of the solvent and the liquid $CO_2$ and the solute solubility of liquid $CO_2$. It is performed by adding $CO_2$ into the top of the extractor while draining it out of the bottom until close to 100% of the solvent used to prepare the gels has been extracted. Then it takes about 2 to 2.5 hours to heat the extractor to above the critical point of $CO_2$ (1070 psi (7378 kPa) and 31.06° C.). It takes this long because the heating must be done at a sufficiently low rate to avoid causing damage to the resulting aerogels. Next there is a thermal stabilization period of about ½ hour. Finally, the depressurization commonly takes about 6 hours.

In total, it currently takes about 40 hours of extractor time to produce a single batch of five 5"×9" (12.7×22.9 cm) flawless 1" (2.5 cm) thick aerogel panels in a 40 liter extractor.

The length of time for aerogel drying is also dependent upon the pore size distribution, tortuosity of the pores and thickness of the aerogel products being prepared since it is the thickness, i.e. the smallest dimension, that determines the distance required for heat and mass diffusion during the drying. The times needed for solvent exchange and depressurization steps vary approximately proportionally to the thickness squared.

Quite simply, this time period has been found to be far too long for aerogel products to be cost competitive with alternative products, e.g. other types of insulation. Moreover, the time is highly dependent upon the physical size &f he extractor, and larger extractors would require an even greater operating time for a single batch of the same sized and shaped gels so that the initial capital investment for large scale production of large aerogel monoliths is too high. In addition to the physical -size and shape of wet gels to be dried, the solvent exchange step depends upon the total amount of solvent that must be extracted. The heating step requires heat to be applied on the extractor walls and then travel through liquid $CO_2$ to reach the gels while avoiding a temperature gradient that is so steep that it causes thermal shock or damage to the still wet gels. And the depressurization is conducted very slowly to supply an adequate amount of heat, again through the extractor walls, to heat the immediate layers of $CO_2$ that in turn has to transmit the heat throughout the entire aerogel volume and the extractor to minimize the possibility of thermal and fluid dynamic-induced damage.

The present invention is the result of research focused on reducing the processing time for preparing aerogel products once wet gels have been placed inside an extractor for supercritical drying.

It is an object of the present invention to substantially reduce the time needed for supercritical drying of wet gels to form an aerogel product.

It is a further object to rapidly produce aerogel products while avoiding creating surface tension induced failures within the aerogels.

It is a still further object to produce aerogel products while maintaining the temperature within the wet gels sufficiently spatially uniform to avoid thermal-induced stress fractures within the gels.

It is a still further object to produce aerogel products while maintaining the fluid surrounding the wet gels at substantially the same temperature and pressure as the fluid within the wet gels.

These and still further objects will be apparent from the following detailed description of this invention.

SUMMARY OF THE INVENTION

This invention is directed to methods of preparing aerogel products by an improved supercritical drying process.

More particularly, this invention is directed to the preparation and/or loading of gels at process temperature to eliminate extractor time to reach the process temperature after the loading.

More particularly, this invention is directed to maintaining the extractor wall temperature at the process temperature to eliminate the time to heat the solid mass of the extractor that will be well insulated thermally.

More particularly, this invention is directed to the use of gaseous $CO_2$ to pre-pressurize an extractor that is loaded with wet gels for flash-free fast injection of supercritical $CO_2$ without causing any flow-induced damage to the gel structures.

More particularly, this invention is directed to the use of $CO_2$ the temperature of which is about the supercritical extraction process temperature and the gel temperature to pre-pressurize an extractor loaded with wet gels without causing any temperature gradient induced damage to the gel structures during pre-pressurization.

More particularly, this invention is directed to the use of gaseous $CO_2$ injected into an extractor as a means of displacing the bulk of the free solvent before super-critical $CO_2$ is injected into the extractor.

More particularly, this invention is directed to the use of supercritical $CO_2$ injected into an extractor to displace the bulk of the solvent before supercritical $CO_2$ is injected into the extractor.

More particularly, this invention is directed to the use of supercritical $CO_2$ injection as a means of direct heat exchange into the supercritical $CO_2$ in the extractor during depressurization to prevent condensation of supercritical $CO_2$. This eliminates most of the solvent remaining in the gels as the supercritical $CO_2$ is removed from the gel by depressurization to just below critical pressure.

More particularly, this invention is directed to the use of a non-reacting, non-condensing gas as a means of direct heat exchange into gaseous $CO_2$ and gas exchange with gaseous $CO_2$ inside the gels during depressurization to prevent condensation of $CO_2$. This significantly shortens the duration of depressurization compared to the conventional slow depressurization in that heat is supplied indirectly through the extractor wall.

More particularly, this invention is directed to the use of a liquid pump followed by a heat exchanger to increase the pressure and temperature of $CO_2$ in a pipe to supercritical conditions to feed into an extractor.

More particularly, this invention is directed to the use of a liquid pump followed by a heat exchanger to increase the pressure and temperature of $CO_2$ in an extractor to supercritical conditions.

More particularly, this invention is directed to the use of continuous flow supercritical $CO_2$ extraction right from the outset to perform solvent exchange and extraction.

More particularly, this invention is directed to the use of a non-reacting, non-condensing gas to remove most of the gaseous $CO_2$ during depressurization to significantly reduce the total amount of heating required during depressurization to prevent condensation of the remaining $CO_2$. The use of the non-reacting, non-condensing gas also enables direct heating of aerogels by a non-reacting non-condensing gas during the depressurization.

More particularly, this invention is directed to the use of a non-reacting non-condensing gas as a direct heating medium during depressurization. The gas takes the heat energy to the gel pieces where the heat energy is needed to significantly reduce depressurization time.

More particularly, this invention is directed to an aerogel drying process the duration of which is substantially equipment scale/size insensitive.

More particularly, this invention is directed to the use of pressure fluctuation to enhance the solvent exchange procedure for the wet gels such as water/ethanol exchange for wet gels made from water glass and acid catalysts.

More particularly, this invention is directed to the use of pressure fluctuations to enhance the supercritical fluid/solvent exchange process, in that high frequency fluctuations increase the effective mass and heat diffusivity at the interface between the supercritical fluid phase and the solvent, and low frequency fluctuations increase the effective mass transport and heat transfer rates through the gel structure.

More particularly, this invention is directed to the use of pressure fluctuation to reduce the time required for depressurization and still avoid condensation of the supercritical fluid into a liquid by low frequency pressure fluctuations that increase the effective mass transport and heat transfer rates through the gel structure.

DETAILED DESCRIPTION OF THE INVENTION

The process of the present invention is directed to an improved process for the manufacture of any type of aerogel product, including beads, monoliths and composites.

As used herein, an "aerogel" includes (unless context requires a narrower meaning) not only a conventional aerogel, but also similar structures that have a micro-porous or nanoporous lattice structure from which a solvent has been removed, such as a xerogel, silica gel, zeolite, or water glass. The term "beads" refers to aerogel bodies of generally spherical shape having a diameter, that is typically in the range of tenths of millimeters to about a centimeter. The term "monolith" refers to a single aerogel body having a minimum dimension, i.e. thickness, with the other two dimensions being larger than the thickness, or to a cylindrical object having a diameter. The thickness or diameter is typically in the range of millimeters to tens of centimeters. The term "composite" refers to an aerogel that has been formed with another substance, e.g. glass fibers, in the gels.

The term "solvent" refers to the liquid dispersion medium used to form the gels and that is removed to form aerogels in accordance with this invention. It is a non-supercritical fluid at the pressure and temperature of interest.

The term "gas" denotes a fluid where the pressure is below the supercritical pressure for that fluid and the temperature is higher than the vapor pressure at the temperature.

The term "fluid" refers to any of a gas, a vapor, and a liquid.

The term "supercritical fluid," refers to a fluid having a pressure above the critical pressure and a temperature above the critical temperature required to make a particular fluid supercritical.

The term "pulse" refers to a brief disturbance of pressure in a fluid by the application of vibrational energy, generally in the form of separate and discrete pulses, for example a shock wave or a cycle of a continuous wave, or a discrete period of application of a continuous wave. The pulse (or wave) preferably has a sinusoidal wave form, but other wave forms, e.g. saw-tooth, square, Gaussian, and harmonics of any of these, may be used. The frequency or the amplitude of a series of pulses can be ramped.

While the process of the present invention is generally described hereinafter referring to supercritical carbon dioxide as the supercritical extraction fluid, all such references are intended to include alternative supercritical extraction fluids unless otherwise specified as specific to carbon dioxide. All references to "critical temperature," "critical pressure," and "critical conditions," refer to the temperature and pressure conditions that apply for the specific supercritical fluid being discussed.

AEROGEL MATERIALS

Aerogels are open pore materials with about 80 or more vol. % porosity and pore sizes ranging from about 0.5 to 500 nanometers. Aerogels may be prepared from any gel-forming materials from which the solvent used for gelation can be removed by drying without destroying or substantially shrinking the pore structures during the drying. The drying can be accomplished through supercritical extraction, atmospheric drying, freeze drying, vacuum evacuation, or the like. Preferably, aerogels are produced by supercritical extraction of the solvent (or any liquid replacement for the solvent) that was used to prepare the starting gels. Preferably aerogels possess a porosity of at least 85 vol. %, more preferably about 90 vol. % and higher.

For purposes of the present invention, aerogels include xerogels which are prepared by air evaporation, i.e. by slow direct drying, without a supercritical extraction step. This is typically accomplished by including a surfactant or pore surface modifier in the gel-forming mixture. Either additive sharply reduces the surface tension and thus the force exerted on the gel by the evaporation fluid, and/or imbues a springback force to reverse pore shrinkage during drying. The drying time is also very long for xerogels. U.S. Pat. No. 5,877,100 to Smith et al. describes a composite form of a xerogel-like material. For a detailed discussion regarding the production of both aerogels and xerogels, see Aerogels: Proceedings of the First International Symposium, Wurzburg, Federal Republic of Germany, Sep. 23–25, 1985, J. Fricke, ed., Springer-Verlag, Berlin-Heidelberg (1986).

The aerogels of the present invention may be organic, inorganic, or a mixture thereof. The wet gels used to prepare the aerogels may be prepared by any of the gel-forming techniques that are well-known to the art including alerogel, hydrogel, templating, and the like. These techniques are all merely different forms of polymerization depending on the solvent or method used for attaining particular microstructures. Suitable materials for forming inorganic aerogels are oxides of most of the metals that can form oxides such as silicon, aluminum, iron, copper, zirconium, hafnium, magnesium, yttrium, etc. Suitable materials for forming organic aerogels are polyacrylates, polystyrenes, polyacrylonitriles, polyurethanes, polyimides, polyfurfural alcohol, phenol furfuryl alcohol, polyfurfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and the like.

Without being bound to a specific type of aerogel or its method of preparation, for the sake of convenience the alcogel route of forming inorganic aerogels is used below to illustrate the invention. The invention is applicable to other aerogels and preparation methods.

Generally the principal synthetic route for the formation of an inorganic aerogel is the hydrolysis and condensation of an alkoxide. The most suitable metal alkoxides are those having about 1 to 6 carbon atoms, preferably about 2 to 4 carbon atoms, in each alkyl group. Specific examples of such compounds include tetra-ethoxysilane (TEOS), tetramethoxysilane (TMOS), tetra-n-propoxysilane, aluminum isopropoxide, aluminum sec-butoxide, cerium isopropoxide, hafnium tert-butoxide, magnesium aluminum isopropoxide, yttrium isopropoxide, zirconium isopropoxide, and the like.

Suitable materials for use in forming the aerogels to be used at low temperatures are the non-refractory metal alkoxides based on oxide-forming metals. Preferred such metals are silicon and magnesium as well as a mixture thereof. For higher temperature applications, suitable alkoxides are generally refractory metal alkoxides that will form oxides, e.g. such aszirconia, yttria, hafnia, alumina, titania, ceria, and the like, as well as mixtures thereof such as zirconia and yttria. Mixtures of non-refractory metals with refractory metals, such as silicon and/or magnesium with aluminum, may also be used.

Major variables in the inorganic aerogel formation process include the type of alkoxide, solution pH, and alkoxide/alcohol/water ratio. Control of these variables can permit control of the growth and aggregation of the aerogel species throughout the transition from the "sol" state to the "gel" state during drying at supercritical conditions. While properties of the resulting aerogels are strongly affected by the pH of the precursor solution and the molar ratio of the reactants, any pH and any molar ratio that permits the formation of gels may be used in the present invention.

Generally, the solvent will be a lower alcohol, i.e. an alcohol having 1 to 6 carbon atoms, preferably 2 to 4, although other liquids can be used as is known in the art Examples of other useful liquids include but not limited to: ethyl acetate, acetone, dichloromethane, and the like.

For silica aerogel-containing low temperature insulation, the currently preferred ingredients are, tetraethoxysilane (TEOS), water and ethanol (EtOH) and the preferred ratio of TEOS to water is about 0.2–0.5:1, the preferred ratio of TEOS to EtOH is about 0.02–0.5:1, and the preferred pH is about 2 to 9. The natural pH of a solution of the ingredients is about 5. While any acid may be used to obtain a lower pH solution, HCl, H2SO4 or HF are the currently preferred acids. To generate a higher pH, $NH_4OH$ is the preferred base.

After identification of the aerogel to be prepared, a suitable metal alkoxide-alcohol solution is prepared. While techniques for preparing specific solutions are described below, the preparation of aerogel-forming solutions in general, and having specific compositions, is well known in the art. See, for example, S. J. Teichner et al, "Inorganic Oxide Aerogel," Advances in Colloid and Interface Science, Vol. 5, 1976, pp 245–273, and L. D. LeMay, et al., "Low-Density Microcellular Materials," MRS Bulletin, Vol. 15, 1990, p 19.

While a single alkoxide-alcohol solution is generally used, a combination of two or more alkoxide-alcohol solutions may be used to fabricate mixed oxide aerbgels. After formation of the alkoxide-alcohol solution, water is added to cause hydrolysis so that a metal hydroxide in a "sol" state is present. The hydrolysis reaction, using tetraethoxysilane as an example, is:

$$Si(OC_2H_5)_4 + 4H_2O \rightarrow Si(OH)_4 + 4(C_2H_5OH) \qquad (1)$$

To form an aerogel monolith, this sol state alkoxide solution is then aged for a sufficiently long period (commonly overnight) that a condensation reaction, as shown in Eq. 2:

$$Si(OH)_4 \rightarrow SiO_2 + 2H_2O \qquad (2)$$

occurs and forms precursors which after supercritical drying in accordance with this invention become aerogels.

EXTRACTION OF SOLVENT-WETTED GELS

The wet gels that form an aerogel product of this invention may be prepared by any gel-forming procedure as previously described. The present invention is independent of the get-forming technique and specific gel-forming materials, and is believed to be widely applicable to the solvent extraction and drying of such gels.

Drying of the cast wet gels is slow, and requires prolonged operations under high pressure and controlled temperature. As noted above, this significantly raises the cost of aerogels, and prevents their use in numerous otherwise desirable situations. A good description of the most advanced techniques of the current art may be found in M. J. van Bommell and A. B de Haan, J. Materials Sci. 29 943–948, (1994).

The wet gels are formed in or placed into a suitable mold and then aged, commonly overnight. In prior art methods, the gels at room temperature are placed into an extractor at room temperature. In one embodiment of the invention, the wet gels, either before or after molding, are brought to a temperature above the critical temperature of the extraction fluid, most commonly $CO_2$ (though other extraction fluids may be used), by any suitable means that does not cause thermal damage to the gels. For example, if the wet gels have been prepared at room temperature, they may be placed in a solvent bath and gradually heated to the appropriate temperature. The maximum heating rate is determined by the thermal conductivity of the particular gel formulation, and should be determined experimentally so that cracking is avoided. Alternatively, the gels may be prepared in a suitable solvent at a temperature about or above the critical temperature. Still further alternatively, the gels may be placed in a solvent bath that has been heated to somewhere below the critical temperature, and then the gels and the solvent bath are heated to above the critical temperature.

In a second embodiment of the method of the invention, the wet gels are inserted into a heated unpressurized extractor, the walls of which are maintained at a temperature above the critical temperature of $CO_2$. So long as no problem with unwanted drying of the gels occurs during loading, then only wet gels need be loaded, i.e. without additional solvent. If the wet gels would suffer damage due to drying during loading, then they can be loaded with solvent, preferably inside a container that is inserted into the extractor. Alternatively, the wet gels can be loaded into an extractor that has previously been filled with saturated vapor of the solvent to prevent drying of the wet gel surfaces. The loading process for gel monoliths is generally per-formed either by lowering the gel monoliths into a vertical chamber or by horizontally inserting them into a horizontally-positioned extractor, i.e. by opening the lid or one side of the extractor. The loading process for beads is generally per-formed by introducing the beads in solvent or a carrier gas, pouring by gravity or pumping into the extractor through a valve or opening. If the wet gels are not loaded with additional solvent, the extractor is then filled with extra solvent in liquid or gaseous form and at a temperature about or above the critical temperature to be used in the eventual supercritical extraction as described further below.

The next step is the removal of the solvent, both any free solvent surrounding the wet gels and that solvent contained within the gels. In the prior art, this has been done either by extraction of the solvent with liquid $CO_2$ (or other suitable fluid.) or as described in M. J. van Bommell et al, supra, with supercritical $CO_2$.

In the method of the invention, the removal begins in any of several ways in which the wet gels are at a temperature that is about or above the process temperature but at a pressure below the eventual process pressure. The solvent removal from the gels is then completed by addition of a supercritical fluid, e.g. $CO_2$.

For example, if the gels in the extractor are surrounded by solvent outside the wet gels, that solvent (referred to as "free solvent") can be drained by opening a valve at the bottom of the extractor. If the gels and solvent are in a container within the extractor, it is preferred that the container be opened both on top and bottom to enhance fluid flow. Then the extractor is pressurized by injecting into the extractor gaseous $CO_2$ at a temperature above the critical temperature and at a pressure that is below the critical pressure. The gaseous $CO_2$ is above the critical temperature and it has a much lower density than the liquid solvent. The gaseous $CO_2$ is fed preferably from the top and will form a bubble space gradually expanding from the top to squeeze the free solvent toward the bottom of the extractor where it is discharged. The free solvent is preferably continually separated from the gas and recovered. Once the bulk of the solvent has been discharged, the gaseous $CO_2$ injection stops. At this point in the process, the temperature inside the extractor is substantially the same as that which will be used in the eventual supercritical solvent extraction process and the pressure is slightly below the critical pressure. Now the supercritical extraction of the solvent from within the gels is performed by feeding supercritical $CO_2$ (or other supercritical extraction fluid) into the extractor, either from the top or the bottom, to remove by diffusion the solvent inside the gels. Supercritical $CO_2$ has a solute diffusivity that is about 10 times higher than that of liquid $CO_2$ while having a viscosity that is only about one tenth that of liquid $CO_2$. Thus the diffusion/infiltration/extraction is more rapid with supercritical $CO_2$ than with liquid $CO_2$. As the supercritical $CO_2$ feeding continues, the extractor pressure increases beyond the critical pressure and all of the $CO_2$ inside the extractor turns supercritical.

Once the extractor has become filled with supercritical $CO_2$, supercritical $CO_2$ containing extracted solvent is continually drained from the bottom of the extractor, since it is of higher density than pure supercritical $CO_2$. The supercritical $CO_2$ injection does not create any violent fluid motion since the extractor is already near, i.e. within about 200 psi, preferably within about 50 psi, and most preferably within about 10 psi of the supercritical process pressure. For supercritical $CO_2$ the pressure must be above 1,070 psi (7,378 kPa). Preferably it is about 1,100 to 1,800 psi (7,585 to 12,411 kPa). The injection process does not create any thermal shock because the temperatures of the solvent, gels, and the supercritical $CO_2$ are all practically identical.

An alternative when the gels are in free solvent in the extractor avoids the initial draining of the solvent. Rather, the clearance volume of the extractor is directly pressurized by injecting gaseous $CO_2$ at about or above the critical temperature but below the critical pressure, into the clearance space below the top of the extractor and above the top surface of the solvent covering the wet gels. The $CO_2$ injection continues until the pressure builds beyond the critical pressure and all of the $CO_2$ turns supercritical. At this point injection of supercritical $CO_2$ begins and a valve at or near the bottom of the extractor is opened to allow discharge of the solvent. In this case the supercritical $CO_2$ that forms an expanding "bubble" from the top, simultaneously removing mostly free solvent along with a small amount of the solvent within the wet gels, by forcing the solvent out the bottom of the extractor. After the supercritical pressure is reached, then the solvent is drained by the further infusion of supercritical $CO_2$ into the top of the extractor at substantially the same temperature as the gels/solvent. This process does not create any violent fluid motion since the clearance volume above the solvent is already pressurized to just below the critical pressure and the wet gels are immersed in the solvent when supercritical $CO_2$ is first present within the extractor. The injection process does not create any thermal shock because the temperatures of the solvent, gels and the supercritical $CO_2$ are all substantially the same.

An alternative to the addition of gaseous $CO_2$ into the clearance volume is the direct injection of supercritical $CO_2$ into that space while the space is at about the desired supercritical temperature. In this case, the supercritical $CO_2$ will initially expand into the clearance space and cool down until the pressure builds up to and beyond the critical pressure. Since the wet gels are immersed in and protected by the solvent when the supercritical $CO_2$ is added and it expands into the clearance volume, there will be no thermal or fluid dynamic shock.

A further alternative when the wet gels (either by themselves or on a carrying tray) are loaded into an extractor without excess solvent is the use of gaseous $CO_2$ to pre-pressurize the extractor to just below the critical pressure, followed by injection of supercritical $CO_2$ into the extractor. The gaseous $CO_2$ pre-pressurization does not create any violent fluid motion since it occurs gradually. The supercritical $CO_2$ injection does not create any violent fluid motion since the extractor is already substantially at the process pressure. The supercritical $CO_2$ injection does not create any thermal shock because the temperatures of the solvent, gels and the supercritical $CO_2$ are all practically identical.

Several steps are proposed here to accelerate the process of preparing an aerogel. First, during or after the gel being prepared, the temperature of the gel is raised to near, preferably above, the critical temperature of the extracting supercritical fluid by the point in time when the gel is to be placed into the extractor. Likewise, the extractor, and the extracting fluid, and any excess solvent required to prevent drying, should also be near or preferably at least just above the critical temperature. Then the wet gel and solvent can be pressurized as rapidly as the gel can withstand the pressure gradient. A temperature is sufficiently near the critical temperature for purposes of this invention if it is not more than about 10° C., preferably not more than about 5°, and more preferably not more than about 2° C. below the critical temperature.

Second, the extracting fluid can be introduced directly in the supercritical state, or rapidly compressed (with due control of heating) to create extracting liquid in the supercritical state in the extractor. Then the extraction of the solvent is performed with supercritical rather than liquid $CO_2$. Because of its increased diffusivity, extraction with supercritical $CO_2$ is faster than with liquid $CO_2$.

In large scale production, these steps can save significant time compared to the prior art, by reducing the time required to prepare the system to begin the process of extracting the alcohol from the wet aerogel with supercritical carbon dioxide.

EXTRACTION OF SOLVENT/INCREASE IN EFFICIENCY BY PULSATIONS

As described above, the current state-of-the art extraction process is performed by circulating an extraction fluid, either liquid or supercritical, past the solvent-wet gels, and (in an industrial-scale operation) separating the supercritical gas from the extracted solvent followed by re-introducing it into the process. Because the pores in the gels are small, liquid flows through the gels very slowly if at all. Instead, the primary method of solvent removal from the gels is by diffusion of solvent out of the gels and into the stream of circulating extraction fluid and diffusion of the extraction fluid into the gel. The inter-diffusion is inherently and relatively slow even using supercritical $CO_2$ instead of liquid $CO_2$, and the time required tends to increase with the square of the thickness of the aerogel body being produced. In laboratory situations, a few hours may be needed for the exchange. In production, however, ten to thirty hours may be required to reliably produce multiple crack-free aerogels of reasonable thickness such as 1 inch. This makes the process expensive to be commercially viable for wide scale applications.

The efficiency of the solvent exchange procedures with an extraction fluid may be enhanced by increasing the fluid's effective mass diffusivity. More particularly, improved solvent exchange efficiency may be obtained by cycling or pulsing the extractor pressure. For example, high frequency low amplitude pressure fluctuations can be used to promote mixing and mass diffusion. Alternatively, low frequency high amplitude pulsations can be used to effectively pump out higher solvent concentration solution (e.g. solution of ethanol in supercritical $CO_2$) from inside the gels and pump in lower solvent concentrated solution into the gel if the extraction fluid is compressible which is the case with supercritical fluids such as $CO_2$. Preferably two different pulsations are used simultaneously for compressible fluids. The pressure cycling/pulsations result in an active pumping and/or enhanced diffusion and mixing process that is more effective than passively relying on simple diffusion of solvent from the gels into the supercritical fluid at slowly changing or constant pressure conditions.

The fluid exchange process is considered to be satisfactorily performed by the method of extraction when the solvent content in the extraction fluid at the discharge of the extractor is less than a predetermined level, the exact value of which will depend upon the specific process being performed, the properties of the fluids involved (the diffusivities and viscosities), pore size distribution, physical size and shapes of the gels being processed, as well as the frequencies and amplitudes of the pulsations used. Generally however, satisfactory levels will be less than about 50 ppm, preferably less than about 20 ppm, and most preferably less than 1 ppm, provided that the discharge solvent content is representative of the solvent content within the gels.

Without wishing to be bound by a theory, it is applicants' belief that high frequency pulsing accelerates fluid exchange within an aerogel because pulsing rapidly dilutes the solvent that is near the boundary between the extraction fluid phase and the liquid solvent phase, inside the gels. This applies to both liquid/liquid and liquid/supercritical fluid exchanges.

For mixtures of supercritical fluid and solvent, there is a single phase region, called a "mixed fluid supercritical region," wherein the mixture with the dissolved solvent is supercritical. It has unexpectedly been discovered that the single phase region of supercritical conditions for many solvent/supercritical fluid mixtures occurs sufficiently near the critical point of the supercritical fluid to use that supercriticality of the mixed fluid to enhance the rate of extraction of the solvent from within the gels, thereby reducing the overall process time.

Using the example of ethanol as the solvent and $CO_2$ as the supercritical fluid, a mixture containing about 50% of each is a single phase and supercritical at pressures above about 1100 psi (ca. 80 MPa) and at temperatures above about 35° C. This is near the usual operating pressures and temperatures for maintaining $CO_2$ in the supercritical state. Therefore, at the initial moment of contact between the wet gels and the supercritical fluid, inter-diffusion begins at the interface between the solvent ethanol inside the wet gels and the supercritical $CO_2$ outside the gels will begin. The inter-diffusion is enhanced by transmitting a high frequency fluctuation through the super-critical $CO_2$. As the mixing at the interface continues, the thickness of the mixing region increases. Soon the external portion of the mixing layer will reach a threshold of "turning supercritical." Since a supercritical fluid is readily compressible like a gas, as opposed to poorly compressible like a liquid, when the mixed fluid turns supercritical it is in com-pressed form both within the extractor generally and within the gel specifically, more of the molecules will on average move into the gel. When the gas re-expands, molecules—not necessarily the same molecules—move out of the "mixed fluid supercritical region" of the gel. Then, when the next pulse compresses the supercritical fluid, a fresh load of supercritical $CO_2$ is pushed into the mixed fluid supercritical layer that has by now increased in thickness. Therefore, to the extent that there is mixing or mutual inter-diffusion between the solvent liquid and the supercritical mixed fluid, then molecules of the solvent liquid are mixed into the supercritical mixed fluid and the new mixed fluid remains supercritlical and is removed from the aerogel. This solvent removal is supplemental to the solvent removal due to pure diffusion, and is much faster.

Without wishing to be bound by a particular theory, the mechanism of diffusion enhancement by high frequency pressure pulses at the interface region of the solvent (liquid ethanol) and the supercritical mixed fluid phase (containing $CO_2$ and ethanol) is believed to be due to differences in wave propagation speed and acoustic impedance within the solvent vs. within the supercritical mixed fluid phase. The pressure wave will first travel through the supercritical phase outside the gel, then through the mixed fluid supercritical phase near and in the gel, and then arrive at the interface with the solvent liquid in the gel. Due to the impedance discontinuity, the pressure wave will be split into two waves at the interface: a transmitted wave and a reflected wave. The fluid particles at two sides of the interface region will tend to move at different speeds due to different wave propagation speeds. To accommodate the impedance discontinuity-induced wave phenomena and the particle velocity discrepancies between the two sides, the interface region between the portion of the gel still containing solvent liquid and the rest of the gel containing supercritical mixed fluid will be perturbed and well mixed, thereby promoting enhanced diffusion across the interface region. This pulse enhanced diffusion is much faster than natural diffusion.

As the enhanced diffusion process proceeds, the interface region moves in the direction of the remaining solvent liquid region of the gel until that region completely disappears and the entire gel structure contains only supercritical phase fluid. Once this happens, the whole gel structure participates in the mass transport enhanced mostly by slower pulses that generate longer distance pumping effect. The pumping action of the slower pressure pulses rapidly lowers the solvent concentration inside the gel at a rate much faster than simple diffusion process relying on concentration gradient. When the concentration of the solvent in the supercritical phase at the innermost portion of the gel, or the highest local concentration of the solvent inside the gel, reaches a low level, e.g. less than about 50 ppm, preferably less than about 20 ppm, and most preferably less than 1 ppm, the solvent extraction process is considered finished and depressurization can begin.

For low frequency high amplitude pulses are used, they serve to enhance solvent removal in the following manner. During the expansion period with low frequency (long wavelength) fluctuations, supercritical mixed fluid having a higher concentration of dissolved solvent will flow out of the aerogels enhancing the rate of solvent removal from the gel while during the compression period the supercritical fluid having a lower concentration of solvent will be forced back into the gel replenishing the gel with fresh supercritical fluid charge at a lower solvent concentration and at the process temperature of the extractor. For example, the density of supercritical $CO_2$ will nearly double when the pressure increases from 1100 psi to 1500 psi at 40° C. In other words, after a compression swing of this amount, fully 50% of the molecules inside the "mixed-fluid supercritical" layer inside the gel will come from the fresh supercritical $CO_2$ stream outside the gel, thereby lowering the concentration of the solvent in the "mixed fluid supercritical layer" and supplying heat to the "mixed-fluid supercritical" layer that had undergone an expansion-related temperature drop. During the subsequent expansion stroke, the heat provided during compression will prevent condensation of the expanding fluid and fully 50% of the molecules inside the "supercritical" layer will come out of the gel into the supercritical fluid to be swept away. The low frequency high amplitude compression and expansion cycles can be repeated until the entire aerogel body is engulfed by "mixed-fluid supercritical" region and until the innermost part of the aerogel contains mostly supercritical fluid with only trace amount of solvent.

Also as the pressure increases during the low frequency compression period and as the fluid is pushed into the gel, the solubility of the supercritical fluid increases almost as a linear function of the supercritical fluid density, thereby promoting the diffusion/solvation process inside the gel. Once the solvent has dissolved into the supercritical fluid and the pressure has decreased, the density of the supercritical fluid lowers causing the fluid to expand out of the gel. The increase in solute solubility of a supercritical fluid such as supercritical $CO_2$ with compression is an additional factor enhancing diffusion of solute from within the gels. Moreover, it has been found useful to gradually increase the wavelength (decrease the frequency) of the pressure pulses as the front between the supercritical fluid and the normal solvent moves into the aerogel and therefore the distance to travel from the mixing layer to the surface of the gel increases.

Therefore, there is independent utility in each of high-frequency-pulses, low frequency pulses, and ramping upward (gradual increase) of the wavelength of at least the low frequency pulses. The combination of two different frequency of pulses, with optional ramping, is expected to be especially effective.

The amplitude of the high frequency pulses at a given frequency is less critical. Higher amplitudes will tend to accelerate the exchange process—ideally linearly, but in practice at less than linearly due to dissipation. The amplitude at a given frequency also has an upper limit, above which the gradient of pressure during a pulse is large enough to damage the structure of the gel. Because the pores of aerogels are so small, the frictional force exerted on the gel structure by passage of fluid is surprisingly large. For many aerogels, the upper limit will be in the range of 5 PSI or so. A pressure amplitude range of about 0.1 to 4 PSI will be typical for-most aerogel materials. The maximum permitted pressure amplitude is dependent on the frequency or wavelength of the sound waves. This is because as the frequency increases, the rate of gas movement increases, and this can place a higher pressure gradient across local regions of the aerogel than is found at lower frequencies of the same amplitude.

For a supercritical $CO_2$ extraction (generally performed at pressures of about 1,100 to 1,800 psi (7585 to 12,411 kPa)), suitable high frequency pulses will have a frequency in the range of about 1 to about 100,000 Hz, more typically 2,000 to 50,000 Hz, and in many cases in the range of about 5000 to 30,000 Hz. Corresponding maximum allowable pressure amplitudes, which will decrease as the frequency increases and which will depend on the pore structure of the gel, will typically be in the range of about 0.01 to about 20 psi, more typically about 0.3 to 5 psi, and often 0.5 to 3 psi.

For the slower pulses, the frequency can be in the range of about 0.0001 to about 10 Hz, more typically in a range of about 0.001 to about 1 Hz. Pressure amplitudes generally range from about 10 psi to up to 1000 psi, more preferably 100 psi to 600 psi, provided that the material can tolerate the pressure gradient, and allowing for the pressure amplitude of the high frequency pulses when used simultaneously.

Specific pressure amplitude/frequency combinations have to be determined for particular compositions of aerogels by routine experimentation taking into consideration the specific porosity, pore size distribution, compressive and tensile strengths of the aerogel lattice structure and physical size and shape. The aerogels are not damaged during the active extraction process either by fluid dynamic erosion, pressure difference induced stress, or otherwise. Also, the resulting temperature swing is not so large as to cause stress failures or loss of supercriticality of the fluid inside the gel.

Other frequencies or wavelengths be used. It is specifically contemplated that higher frequencies, for example in the range of 100,000 to 10 million Hz (used in ultrasound and lithotripsy), may prove to be as useful or more useful than the presently explored range of about 1 to about 100,000 Hz. Such faster cycles require lower amplitudes to avoid creating excessive pressure gradients.

In selecting a pulse amplitude, it should also be recalled that an excessive pressure drop, starting from a particular pressure and temperature, can cause a phase change of a supercritical fluid into a conventional liquid or gas. If the amplitude is sufficiently large, it can also cause re-condensation of the solvent into a separate liquid phase due to a reduction in solubility when the density is reduced by pressure reduction even though the extraction fluid remains supercritical. If the phase of the extraction fluid changes from supercritical to a gas, most of the solvent will recondense due to a drastic reduction in solubility.

If appropriately limited, however, a moderate degree of lowering of the pressure or density will not cause re-condensation of the solvent, since most supercritical fluids have very high solute solubility for the usual solvents used to form aerogels. It should be noted that during pressure fluctuations, the shape and size of the gel lattices and their pores do not undergo any appreciable dimensional changes because the pressure will remain sufficiently balanced isometrically provided that (i) the speed of the change is slow enough to be quasi-steady for the slower pressure fluctuations, and (ii) the amplitudes of the faster fluctuations are much smaller than the mean pressure and lower than the threshold pressure to cause structural changes. There is hydrostatic quasi-equilibrium inside the entire gel volume and during the cycling that status does not change.

The pressure fluctuation process relies, in one mode, on the fact that supercritical $CO_2$ behaves like a gas in terms of compressibility. So when compressed more super-critical $CO_2$ can be packed into the same pore volume as before and when expanded, the solvent laden supercritical $CO_2$ tends to come out of the gels.

Pulses suitable for the practice of the invention may be generated by any means or method that gives the required frequency and amplitude of pulsations in pressure inside the extractor. The source of the pulses can be inside the extractor; outside the reactor (and typically in intimated contact with it); or forming a part of the reactor. The pulses may be generated by one or more of a piezoelectric device, an electromechanical device, a piston, a mechanical device, a diaphragm, a bellows, an inflatable device, or by variation of the input pressure or the backpressure of a fluid or a gas flowing through the extractor. For example, a piezo-electric device can be the driver for a hydrophone, and an electromechanical device can be a solenoid, as is used in a loudspeaker. A mechanical device could include a striking hammer, as is used to strike a bell. An inflatable device could be an expandable balloon or bellows, either within the extractor or exterior to it and connected by a port. An inflatable device could be inflated by a gas or liquid. Likewise, a piston could be internal, or external via a port, and could be moved by pressure or by mechanical force. Each of these ways of generating a series of pressure waves is well known. For example, back pressure can be varied under electronic control by opening and partially closing the exit port or the entrance port of an extractor (or other closed vessel) while applying a constant pressure to a fluid entering or exiting through another port. Coupling of a source of pulsation to the extractor may be by any conventional method.

DEPRESSURIZATION PROCESS/INCREASE EFFICIENCY BY PULSATIONS

Once the solvent has been exchanged for supercritical fluid throughout the entire volume of the aerogel, the next step to complete the preparation of the aerogel is to release the pressure in the extractor so that the aerogel can be returned to atmospheric pressure. This is a slow process in current conventional practice because if the pressure is simply released in an uncontrolled manner, the supercritical fluid will return to a liquid state damaging the aerogels. The supercritical fluid remaining inside the gels as a result of the solvent exchange procedure will approximately follow isentropic expansion during an uncontrolled depressurization. In other words, supercritical $CO_2$ will tend to cool as it expands unless sufficient heat is supplied to the interior of the gels to prevent the supercritical $CO_2$ from turning into liquid $CO_2$ that will damage the aerogels that have been prepared.

Depressurization is typically performed in multiple stages. In a first stage, the extractor is depressurized to just below the critical pressure while maintaining the temperature above the critical temperature. This may be done in any conventional manner, but requires supplying heat to the aerogel so that the $CO_2$ remains a gas as the pressure crosses through the critical pressure. After the pressure is below the critical pressure, it is then reduced very gradually until reaching atmospheric pressure. Since aerogels are efficient insulators, this second stage of the depressurization process is necessarily a slow process. Generally this is done at a rate of about 15 psi/minute or below, depending on the aerogel sample size, pore distribution, initial pressure, etc.

The difficulty with heat transfer into the gel during depressurization is compounded by the fact that the $CO_2$ must move out of the gel while the heat has to flow up-steam of the $CO_2$ flow! Moreover, the low solid content of an aerogel structure through which that heat must flow into the interior of the gels means that solid conductivity of the heat is also extremely low. The problem is compounded by the fine lattice structure and torturous heat conduction pathways. However, for a more rapid depressurization, the heat must be delivered into the interior of the gel faster than is currently possible.

Two techniques have now been discovered to speed up the depressurization process. The first technique employs low frequency pressure fluctuations to help deliver the necessary heat into the interior of the gel. As a first stage, the process entails reducing the pressure from above the critical value for the extraction fluid to just below the critical pressure without condensing the extraction fluid into a liquid. As the mean pressure is reduced by opening a discharge valve, supercritical $CO_2$, is pumped into the extractor at a gradually decreasing pressure. While the pressure is being steadily reduced, a superimposed low frequency pulsation of the pressure is performed. During the compression portion of the pulse, the relatively warm supercritical fluid from outside the gel is packed into the interior of the gel, thereby delivering necessary heat to allow speeding up this first stage of the depressurization process. Then during the expansion portion of the pulse, the supercritical fluid is removed from the gels. Thus there is improved heat transfer into the gels.

As a second stage the pressure is reduced from just below the critical pressure to atmospheric pressure. As the mean pressure is reduced by opening a discharge valve, heated gas, e.g. $CO_2$ gas, not supercritical $CO_2$, is pumped into the extractor at a gradually decreasing pressure which is just above the extractor pressure. Simultaneously, a low frequency pulsation is superimposed to pack in (due to the compression) warmer $CO_2$ into the interior of the gels, thereby delivering necessary heat during the superimposed compression cycle and removing the $CO_2$ during the superimposed expansion cycle to speed up the second stage of the depressurization process.

An alternative technique for more rapidly performing the depressurization begins with exchanging the supercritical fluid, e.g. $CO_2$, with an inert gas that will not turn liquid at the temperatures and pressure ranges encountered during the depressurization of the reactor to atmospheric temperature. To achieve this, an injection of a non-reacting non-condensing (NRNC) gas will be used. The timing and method of the NRNC gas injection may be performed in a variety of ways.

Method 1—Complete exchange of the supercritical $CO_2$ with a non-reacting non-condensing gas while maintaining the temperature and pressure within the supercritical region of $CO_2$ until all of it is replaced. This is a good method when the solvent concentration in the supercritical $CO_2$ inside the gels is so low that recondensation will not cause harm to the gels as the NRNC gas is injected.

The gas exchange is diffusive, and like solvent extraction, will suffer from the slowness of a diffusion-limited process. While diffusion of a gas is faster than of a liquid, it can still require too long to exchange the $CO_2$ for a NRNC gas. Thus, preferably the inert gas is exchanged for the supercritical gas with the use of pressure pulses, as described above for the solvent extraction. High frequency pulses accelerate gas exchange in the pores. Low frequency, long wavelength pulses pump the $CO_2$ out from within the gels as well as pump fresh NRNC gas into the gels. The wavelength can be matched to a characteristic dimension of the aerogels in the extractor. The inert gas can also be heated, thereby allowing depressurization to proceed more rapidly even while the gases are being exchanged.

Method 2—Gas exchange after the supercritical $CO_2$ has been depressurized to a constant mean pressure just below the critical pressure while pressure pulsations occur. This method is preferred if the solvent concentration at the end of the solvent exchange process is still not as low as desired and a final draw down of the solvent is wanted. In this method, right after the supercritical $CO_2$ is depressurized to just below the critical pressure in a conventional manner, the $CO_2$ gas is replaced by a nonreacting, non-condensing gas (NRNC). This process requires that once the pressure is reduced to below the supercritical range, any residual solvent is at a sufficiently low concentration as to not cause damage to the aerogels due to either condensation or sudden reduced solvent solubility of the extraction fluid. Thus at the beginning of the depressurization process, the fluid in the extractor begins as supercritical $CO_2$, then it becomes gaseous $CO_2$, then a mixture of gaseous $CO_2$ and a NRNC gas, and finally NRNC gas after the exchange is completed.

The NRNC gas is preferably heated to about the critical temperature of the supercritical $CO_2$ to maintain a uniform temperature inside and outside of the gels. This initiates a gas exchange procedure that removes first the gaseous $CO_2$ from within the aerogel structures and from within the extractor. The NRNC gas will form a bubble pushing the remaining $CO_2$ out of the extractor. The exchange can be performed entirely by diffusion into a flowing stream of the NRNC gas.

Preferably, the gas exchange is conducted at a substantially constant mean pressure just below the critical pressure. This may be performed by continually adding a heated non-reacting non-condensing gas at the same or higher pressure than is in the extractor until the $CO_2$ is sufficiently removed that there is no longer any risk of damage from $CO_2$ condensation within the aerogels. To speed up this gas-to-gas exchange step of the depressurization process, low frequency pressure pulses around the mean pressure are applied. The low frequency pulses pump the $CO_2$ out from within the gels as well as pump fresh NRNC gas into the gels. The two mechanism will work in tandem with each other. First, by enhancing inter-diffusion between $CO_2$ gas and NRNC gas, and second, by the pumping effect. After the highest concentration of $CO_2$ within the gels drop below a level (e.g., 50 ppm, preferably 20 ppm, most preferably 10 ppm) that could pose a threat of condensation related damages, then the extractor pressure may be reduced to atmospheric pressure without needing to provide heat transfer to the inside of the aerogels without further pressure pulsations.

There are several advantages to performing the gas exchange before depressurization. By replacing the $CO_2$ with a heated non-reacting, non-condensing gas, the depressurization can proceed rapidly since the NRNC gas cannot liquefy during depressurization, no matter how fast it occurs. Of course, even in this case the depressurization must not be so rapid that the physical strength of the aerogel to tolerate the pressure differential between inside and outside the gels is exceeded. Since the risk of phase change during rapid depressurization is precluded, thermal stress is not a problem since the temperatures both inside and outside the gels will fall simultaneously, i.e. the temperature will remain uniform spatially but not temporally. The time needed for the gas exchange is limited only by the gas-to-gas diffusion inside the gels.

Method 3—Gas exchange from the start of the depressurization process until the end as the pressure floats down, preferably with pressure pulses being used throughout the entire process. While this method does not require any waiting time at a fixed pressure to exchange gases, the depressurization in later stages cannot be as fast as the other two methods because the possibility of damage caused by recondensation of the extraction fluid, e.g. $CO_2$, remains. This third method entails simultaneous gas exchange and gradual pressure reduction. In this case, a heated non-reacting, non-condensing (NRNC) gas is injected into the extractor and exchanged with the supercritical $CO_2$ inside the aerogels to avoid condensation of the $CO_2$. The NRNC gas serves as the primary means of supplying heat to the aerogels evenly and quickly to prevent condensation of the remaining $CO_2$ within the aerogel pores. The pressure of the gas is floated down along with the pressure of the extractor.

This gradual reduction of pressure can be accomplished by means of a compressor with appropriate intake and discharge valves to divert excess non-reacting, non-condensing gas flow into a suitable gas storage tank. Interdiffusion of the NRNC gas and the $CO_2$ through the aerogel thickness determines how fast the heat and gases can be transmitted or interdiffused to the interior of the aerogels. The speed of the simultaneous gas exchange and depressurization is mainly limited by gas-to-gas diffusion inside the gels and the rate of heat transfer from the gases outside the gels to the $CO_2$ inside the gels Since there is a close coupling of gas diffusion/exchange and heat diffusion, the process of heating the remaining $CO_2$ in the interior of gels is more efficient than simple heat diffusion through the gels.

Suitable non-reacting, non-condensing gases useful herein for any of the above mentioned three depressurization methods include, but are not limited to, nitrogen, helium, argon, and dry air. The gas must not unintentionally react with the gels or the solvent and it must not condense into a liquid at the temperatures and pressures of use. Preferably the gas is nitrogen, dry air, or helium. Nitrogen will generally be used because it is relatively inexpensive. When dry air is available, it will be even less expensive than nitrogen. Helium, with its much higher thermal and mass diffusivity than either of the other two gases is the preferred gas when the rate of heat transfer and gas inter-diffusion through a gel block becomes crucial, such as when large wet gel monoliths are to be dried quickly. Suitable but less preferred gases (for $CO_2$ exchange) include hydrogen, oxygen, methane, ethane, neon and argon.

The frequency ranges of suitable pulses described above for the exchange of a supercritical fluid for a solvent liquid also apply to gas/supercritical fluid exchange. The pressure amplitudes acceptable for a particular frequency and aerogel will tend to increase, since the fluids are on average less dense and have much lower viscosity which decreases the stress on the aerogel at a particular pressure amplitude for a given frequency.

The pressure cycling/pulsations produce an active gas exchange process that is more effective than relying solely on the passive method of simple inter-diffusion of gases inside aerogels at slowly changing or constant pressure conditions. The process does not involve any changes in the pore matrix shape or size—there is quasi-hydro-static equilibrium inside the entire gel volume and during cycling that status will not change.

In short, use of the preferred embodiment of Method 2 of the aerogel drying process of this invention has reduced the time of extraction and drying from the nearly 40 hours required for a conventional liquid $CO_2$ aerogel process to produce high quality aerogels of 1 inch (2.54 cm) thickness to less than 8 hours and with optimization is expected to decrease the time to 4 hours or less.

ALTERNATIVE AEROGEL PREPARATIONS

The present invention is applicable to aerogels that are prepared by a process that does not include supercritical fluid extraction and depressurization as described above.

More particularly, it is applicable to aerogels prepared by a liquid-liquid extraction process at atmospheric conditions as is used to wash salt-laden water from hydrogels made from water glass or to exchange water for an alcohol for hydrogels made from water glass. Water glass (sodium silicate) contains the essential component to form silica aerogels and is one of the least expensive precursors capable of making silica aerogels, generally costing less than 10% of that of tetra-ethoxysilane. Adding a catalyst such as sulfuric acid to water glass produces a wet gel that also contains salt and water which must be removed to make pure aerogels. A long and laborious salt washing step using fresh water is required to remove the salt from the water glass derived hydrogel. And even after the salt is removed, since water is effectively immiscible with common solvent exchange fluids such as $CO_2$ or supercritical $CO_2$, the water in the wet gel must then be replaced with a solvent like ethanol that is miscible with or highly soluble in $CO_2$ or other fluids for supercritical extraction. Direct drying of a water glass hydrogel gives a dense, collapsed structures unless a xerogel drying process is utilized.

Use of high frequency pulses to promote the diffusion enables washing of the salt from inside the hydrogel into the water to the outside in a much more expeditious manner than simple diffusion-limited water soaking. High frequency pulses can also be used to expedite the exchange of water with ethanol. Then the ethanol can be removed from the wet gels to form aerogels by conventional processing. More preferably, however, it is removed by the more rapid supercritical processing and rapid gas exchange processes described above for supercritical extraction processing. The operating parameters for pulse frequency, amplitude, method of generation and the like are substantially the same as described. Specific preferred conditions will depend upon the specific system and equipment available for use. Since such conditions can be determined by routine trial and error based upon the principles of pulsation described, further details are not necessary. This process of liquid-liquid extraction via pulsation opens up new possibilities of speeding up the process and render it inexpensive for making aerogels with significantly lower raw materials costs.

Xerogels are formed by slow direct drying of wet gels containing one or more special additives that enable the drying to occur without substantial reduction in porosity and without the supercritical extraction step described above. This type of drying of the wet gels to form xerogels can also be enhanced by use of the pulsation technique described herein. More specifically, when a wet gel containing a solvent liquid (e.g. water) is exposed to a drying gas (e.g. air), the vapor pressure in the dry air is lower than the vapor pressure of the liquid solvent contained in the pores of the gel. Therefore, the solvent liquid will begin to evaporate. As the evaporation front moves inward, a layer of pores will form that are filled with vapor of the solvent liquid starting from the saturation concentration at the liquid interface and gradually decreasing toward the surface of the gel. The vapor pressure of the solvent is much higher within the pores than outside the gel. The normal drying process relies on simple diffusion of high concentration vapor from inside the gel into the outside. Since the liquid is surrounded or bathed in the high vapor concentration gas inside the gel, the rate of drying is relatively slow. When pressure pulses are used as described herein, however, during compression low frequency pulses will effectively pump in largely fresh air from outside into the pores of the gel where there are high concentration vapor. During expansion the concentrated vapor inside the pores will be pumped out. So, instead of having to wait for the concentration gradient to work its way through passive diffusion, the slow frequency pulsation will much more quickly remove the high concentration vapor from within the gels. As a result, the remaining liquid is exposed to a low concentration vapor pressure at the interface with the drying gas within the gel structure. High-frequency small amplitude pulsations of the drying gas to promote the vaporization may also be used, either alone or in combination with the low frequency pulses. Use of the high frequency pulses will be akin to "ocean spray" effect by creating disturbances of particles at the liquid-gas interface thereby increasing the surface area of the liquid vapor interaction and enhancing the vaporization.

Frequencies and amplitudes for the pulsations will depend on the properties such as density, viscosity, diffusivity, saturation vapor pressure at the process temperature, of the liquid, gas; gel pore dimensions, distribution, tortuosity of the open pores, size and shape of the gels, etc. Suitable such conditions can be determined by routine experimentation.

The use of the pressure pulsation techniques described herein make previous diffusion-limited exchange processes much more rapid which should lead to new synthetic pathways for the preparation of aerogels and similar materials. The pulsation methods are useful in any of the nine possible exchange types, i.e. each of liquid, gas, and supercritical fluid with each of liquid, gas and supercritical fluid.

TEST CELL FOR OBSERVING EXTRACTIONS

A convenient way to optimize the sequence or sequences of pulses is to set up a pressurizable cell with windows, as an analog of the extractor. Standard pieces of solvent-filled aerogels can be made, placed in the cell, surrounded with supercritical fluid, and observed under the influence of pulses. Any evaluation method that does not require opening the test cell to measure the rate of efflux of the solvent from the gel may be used. For example, a change in the refractive index is potentially measurable for any solvent or supercritical fluid or combination. Alternatively, the concentration of solvent in the exiting supercritical fluid can be measured. This is an advantageous method, especially if correlated with other methods, because it requires no special apertures or sensors in the extractor.

A more direct method is to place a dye the solvent used to prepare the wet gels or in the supercritical fluid and to observe the rate of removal of the dye from the gels, or the penetration of the dye into the gels, under various pulsing conditions. Optimizing the rate of change of the boundary location by varying the frequency or amplitude of the pulses becomes a rapid and straightforward procedure, readily giving a significantly improved exchange procedure by minimal experimentation.

EXAMPLE 1

Two wet gel samples were prepared from tetraethoxysilane (TEOS) essentially as described in the art. A red dye soluble in ethanol but not in $CO_2$ was dissolved into ethanol. During the gel preparations, the ethanol-dye solution was used in place of conventional pure ethanol. This resulted in red-colored wet gel samples.

To evaluate the effect of sonic pulses on the enhancement of diffusion process, two wet gel samples were processed as follow after overnight curing. The first was simply immersed in ajar containing pure ethanol and the diffusion of the red dye was monitored. The second was also immersed in a jar of pure ethanol, but then the jar was placed in a small sonic cleaning bath with a 1.25 cm thick sponge pad placed between the bath and the jar to attenuate the sonic amplitude and to prevent premature breakage of the gels by the sonicator. The sonic cleaning bath generated fixed-wavelength pulses at 20 kHz. The diffusion of the red dye out of the gels into the ethanol was observed and periodically photographed. A UV spectrometer measured the frequency of the UV light transmitted through the ethanol.

The results show that the dye was extracted more rapidly in the sample that was sonicated. Extraction to approximate equilibrium was obtained in about 45 minutes in the pulse-treated gel, but has not reached completion after 16 hours in the absence of pulsation. UV spectrometer plots confirmed that the sonically enhanced diffusion was approximately 20 times faster than the natural diffusion.

The diffusion enhancement by pressure pulsation technique is not limited to supercritical fluids or gas-to-gas exchanges. As shown in Example 1 above, liquid-liquid extractions can also be accelerated by pulsation. Although liquids (here, ethanol) are relatively incompressible in comparison with supercritical $CO_2$ or gases), it was found that use of a fixed-wavelength source of pulsation at 20 kHz decreased the extraction time by a factor of about three in early stages, and probably in excess of twenty or more at later stages to accomplish an extraction in about 45 minutes that required about 16 hours without pulsation.

What is claimed is:

1. A method for reducing the time required to exchange a solvent liquid located within a gel with a supercritical extracting fluid in a means for performing the exchange during the preparation of an aerogel, comprising providing the solvent liquid within the gel at a temperature no more than 10° C. below the critical temperature of the supercritical fluid before the supercritical fluid contacts the solvent liquid and further comprising applying pressure pulses of two different frequencies to the gel, the solvent liquid and the supercritical extracting fluid during the exchange.

2. The method of claim 1, wherein the pulses are generated by one or more of a piezoelectric device, an electromechanical device, a mechanical device, liquid piston, a piston, a diaphragm, an inflatable device, audio frequency speakers, mechanical tapping, vibrating table, and a variation in the pressure or the back pressure of a fluid or a flowing gas.

3. The method of claim 1, wherein the two different frequencies are a first frequency of about 1 to about 100,000 Hz and a second frequency of about 0.0001 to about 10 Hz and the second frequency is lower that the first frequency.

4. The method of claim 3, wherein the pulses of the first frequency have an amplitude of about 0.1 to 20 psi and the pulses of the second frequency have an amplitude of about 10 to 1,000 psi and the amplitude at the second frequency is higher than the amplitude of the first frequency.

5. A method for rapid depressurization of a supercritical fluid within and around an aerogel porous medium, the method comprising exchanging the supercritical fluid with a non-reacting, non-condensing gas before or during the depressurization and further comprising applying pulses of two different frequencies.

6. The method of claim 5, wherein at least one of the two different frequencies is systematically varied during the depressurization.

7. The method of claim 5, wherein the two different frequencies are a first frequency of about 1 to about 100,000 Hz and a second frequency of about 0.0001 to about 10 Hz and the second frequency is lower that the first frequency.

8. The method of claim 7, wherein the pulses of the first frequency have an amplitude of about 0.1 to 20 psi and the pulses of the second frequency have an amplitude of about 10 to 1,000 psi, and the amplitude at the second frequency is higher than the amplitude of the first frequency.

9. A method for rapid depressurization of a supercritical fluid within a porous medium in a device, the method comprising supplying heat into the device through injection of a heated supercritical fluid down to just below its critical pressure and thereafter injection of a heated gas down to about atmospheric pressure.

10. The method of claim 9, wherein the porous medium is an aerogel.

11. The method of claim 9, further comprising applying pulses of pressure during said exchange.

12. The method of claim 11, comprising applying pressure pulses of two different frequencies.

13. A method for decreasing the time required for preparing an aerogel in an extractor wherein the aerogel is filled with a supercritical fluid, the method comprising exchanging the supercritical fluid with a non-reacting non-supercritical gas, followed by depressurization.

14. The method of claim 13, wherein the inert non-reacting non-supercritfcal gas is selected from air, nitrogen, oxygen, helium, neon, argon, hydrogen, and mixtures thereof.

15. The method of claim 13, wherein the gas exchange is accelerated by applying pulses of pressure to the non-reacting non-supercritical gas phase.

16. The method of claim 14, wherein two sets of pulses are applied to said supercritical fluid, wherein a first set of pulse has frequencies of about 1 Hz to 100,000 Hz, and the second set of pulses has frequencies in the range of about 0.001 to 10 Hz, and the second frequency is lower that the first frequency.

* * * * *